(12) United States Patent
Jang et al.

(10) Patent No.: US 9,627,932 B2
(45) Date of Patent: Apr. 18, 2017

(54) STATOR ASSEMBLY WITH MAGMATE HOLDER

(75) Inventors: Jeong Cheol Jang, Gwangju (KR); Wang Gyu Jeong, Gwangju (KR); Min Kyu Cha, Gwangju (KR)

(73) Assignee: NEW MOTECH CO., LTD., Gwangju (KR)

(*) Notice: Subject to any disclaimer, the term of this patent is extended or adjusted under 35 U.S.C. 154(b) by 380 days.

(21) Appl. No.: 14/235,088

(22) PCT Filed: Jun. 8, 2012

(86) PCT No.: PCT/KR2012/004553
§ 371 (c)(1),
(2), (4) Date: Jan. 27, 2014

(87) PCT Pub. No.: WO2013/024964
PCT Pub. Date: Feb. 21, 2013

(65) Prior Publication Data
US 2014/0159520 A1    Jun. 12, 2014

(30) Foreign Application Priority Data

Aug. 17, 2011  (KR) .................. 10-2011-0081660

(51) Int. Cl.
*H02K 1/18* (2006.01)
*H02K 3/52* (2006.01)
(Continued)

(52) U.S. Cl.
CPC .............. *H02K 1/18* (2013.01); *H02K 3/522* (2013.01); *H02K 5/225* (2013.01); *H02K 11/20* (2016.01)

(58) Field of Classification Search
CPC ........ H02K 3/522; H02K 3/524; H02K 5/225; H02K 1/18; H02K 11/001; H02K 11/00;
(Continued)

(56) References Cited

U.S. PATENT DOCUMENTS

| 5,543,703 A  * | 8/1996 | Kusase ............... H01L 29/7803 |
| | | 180/65.245 |
| 7,893,578 B2 * | 2/2011 | Hayashi ................. H02K 3/522 |
| | | 310/156.05 |

(Continued)

FOREIGN PATENT DOCUMENTS

| JP | 2005-198440 A | 7/2005 |
| JP | 2006-074858 A | 3/2006 |

(Continued)

OTHER PUBLICATIONS

JP 2007215335 A machine translation Jun. 13, 2016.*
International Search Report for PCT/KR2012/004553 mailed on Dec. 26, 2012 from ISA/KR.

*Primary Examiner* — Joshua Benitez-Rosario
*Assistant Examiner* — Leda Pham
(74) *Attorney, Agent, or Firm* — Revolution IP, PLLC

(57) ABSTRACT

Disclosed therein is a stator assembly, which includes a circular base part and a stator core having a plurality of teeth radially formed on an outer face of the base part and respectively having a tooth end portion. The stator assembly further includes: a magmate holder including a base plate, at least one inner leg and at least one outer leg formed at a lower portion of the base plate, and a power connector part formed on an upper portion of the base plate and having a joining projection formed at one side thereof; and a sensor cover including a body part and a hook formed on a lower portion of the body part and being joined with the joining projection.

4 Claims, 4 Drawing Sheets

(51) Int. Cl.
*H02K 5/22* (2006.01)
*H02K 11/20* (2016.01)

(58) Field of Classification Search
CPC  H02K 3/28; H02K 1/14; H02K 29/08; H02K 15/00; H02K 3/32; H02K 3/50
See application file for complete search history.

(56) References Cited

U.S. PATENT DOCUMENTS

| | | | |
|---|---|---|---|
| 8,063,524 B2 * | 11/2011 | Shin | H02K 1/187 310/194 |
| 2003/0214198 A1 * | 11/2003 | Harada | H02K 1/16 310/263 |
| 2005/0189837 A1 * | 9/2005 | Lee | H02K 3/522 310/216.004 |
| 2007/0046127 A1 * | 3/2007 | Kloeppel | H02K 3/18 310/180 |
| 2008/0100171 A1 * | 5/2008 | Nakajima | G11B 19/2009 310/254.1 |
| 2013/0140926 A1 * | 6/2013 | Bailey | H02K 1/187 310/71 |

FOREIGN PATENT DOCUMENTS

| | | |
|---|---|---|
| JP | 2007215335 A * | 8/2007 |
| KR | 20-1991-0021089 U | 12/1991 |
| KR | 10-0312012 B | 10/2001 |
| KR | 10-2007-0012523 A | 1/2007 |
| KR | 10-2008-0081412 A | 9/2008 |

* cited by examiner

STATOR ASSEMBLY WITH MAGMATE HOLDER

CROSS REFERENCE TO PRIOR APPLICATIONS

This application is a National Stage Application of PCT International Patent Application No. PCT/KR2012/004553 filed on Jun. 8, 2012, under 35 U.S.C. §371, which claims priority to Korean Patent Application No. 10-2011-0081660 filed on Aug. 17, 2011, which are all hereby incorporated by reference in their entirety.

TECHNICAL FIELD

The present invention relates to a stator assembly of a motor, and more particularly, to an improved stator assembly of a motor, which is easy to manufacture and can reduce manufacturing costs.

BACKGROUND ART

In general, a motor includes a stator and a rotor. When AC voltage is applied to a coil wound on the stator, the rotor rotates by a rotational magnetic field, and the rotation of the rotor causes a rotation of a load applied to a rotor shaft. For instance, in the case of drum washing machines, a drum is connected to the rotor shaft to thereby rotate with the rotor.

As described above, in order to supply electricity to the motor or to apply an electric current to the motor, the stator assembly of the motor includes a connector connected with a coil wound on the stator. Korean Patent No. 10-1013781 discloses a stator assembly, and FIG. 1 is an exploded perspective view of the stator assembly.

As shown in FIG. 1, the stator assembly according to the prior art includes a stator core 100, and upper and lower insulators 210 and 220 respectively covering upper and lower portions of the stator core 100. The stator core 100 includes a circular base part 110, which is a central part of the stator core 100, and teeth 120 radially formed on an outer face of the base part. Each of the teeth 120 includes a tooth end portion 125 formed at the end portion opposed to the base part and has a T-shaped cross section. A coil is wound on each of the teeth 120 in a state where the upper and lower insulators 210 and 220 are joined together.

At an upper portion inside the upper insulator, the upper insulator 210 includes a tap terminal 211 for a power terminal, which is a connector for connecting a power line, and another tap terminal 212 for connecting a common terminal (neutral point) of each phase. A sensor cover 215 includes a hall sensor (not shown) mounted therein, and a tap connection part 216 connected to the tap terminal 211 for the power terminal and a power terminal part 217 for connecting electricity are formed in an outward direction opposed to the tap connection part 216. The tap connection part 216 and the power terminal part 217 are connected by a lead wire (not shown) disposed inside the sensor cover.

According to such a structure of the stator assembly of the prior art, the upper insulator 210 and the lower insulator 220 are made from resin molding, and hence, a great deal of resin moldings are used, and a size of the sensor cover 215 is increased because the tap terminal 211 for the power terminal and the tap terminal 212 for the common terminal are formed inside the upper portion of the upper insulator 210, namely, formed more inside than the base part 110.

Accordingly, in order to solve the above problems, the inventors of the present invention introduce a new structure to join the sensor cover in a state where the surface of the stator core is insulated by powder coating without the structure that the entire of the stator core is insulated by the insulator, so as to reduce an amount of resin molding, simplify the manufacturing process and reduce manufacturing costs.

DISCLOSURE OF INVENTION

Technical Problem

Accordingly, the present invention has been made in an effort to solve the above-mentioned problems occurring in the prior arts, and it is an object of the present invention to provide a stator assembly of a new structure, in which an insulator covering the entire of the upper portion and the lower portion is not applied to a stator core.

It is another object of the present invention to provide a stator assembly with a magmate holder for joining a sensor cover and a stator core together.

The foregoing and other objects of the present invention will be achieved and apparent from the following description, the appending claims and the accompanying drawings.

Solution to Problem

To achieve the above objects, the present invention provides a stator assembly, which includes a circular base part and a stator core having a plurality of teeth radially formed on an outer face of the base part and respectively having a tooth end portion, including: a magmate holder including a base plate, at least one inner leg and at least one outer leg formed at a lower portion of the base plate, and a power connector part formed on an upper portion of the base plate and having a joining projection formed at one side thereof; and a sensor cover including a body part and a hook formed on a lower portion of the body part and being joined with the joining projection.

The sensor cover includes a sensor part disposed at one side of the body part thereof, and the sensor part includes at least one fixed leg, which is formed at a position corresponding to the tooth end portion and has a tooth end insertion hole formed at a lower end portion of one side of the fixed leg.

A stopper is formed on the upper end of the tooth end insertion hole.

The body part includes a bolt insertion hole formed at one side thereof, and a bolt inserted into the bolt insertion hole is inserted and fixed into a bolt insertion hole formed in the base plate of the magmate holder.

The stator core includes an insulation coating layer formed on the outer surface thereof.

A stator core according to the present invention includes a circular base part and a stator core having a plurality of teeth radially formed on an outer face of the base part and respectively having a tooth end portion, and further includes a first coating layer formed on the entire surface of the base part and the teeth and a second coating layer formed on the surface of the first coating layer.

Advantageous Effects of Invention

The stator assembly of a new structure according to the present invention can simplify the manufacturing process and reduce manufacturing costs.

Description will now be made in detail of preferred embodiment of the present invention with reference to the attached drawings.

MODE FOR THE INVENTION

Figure 1:
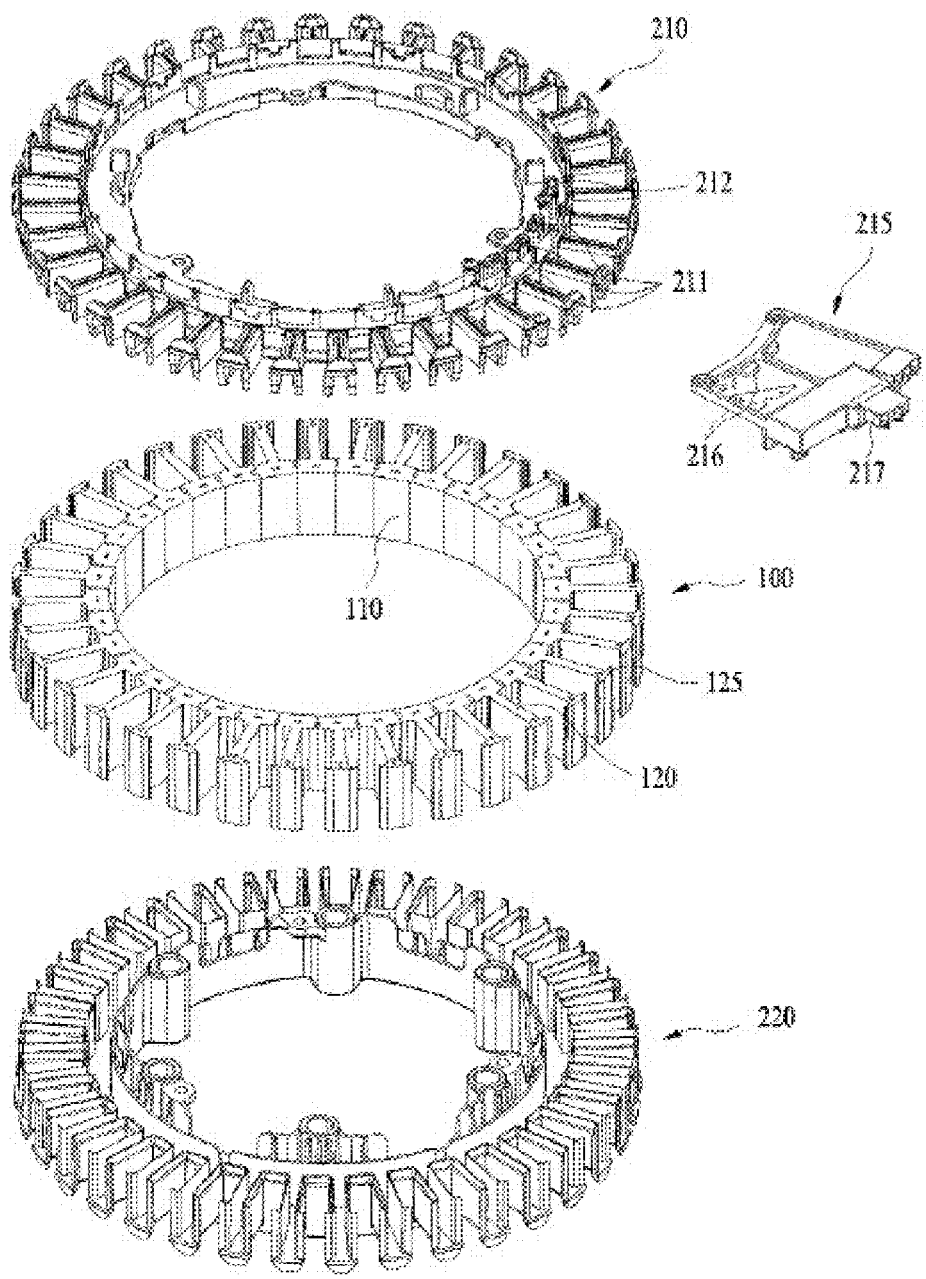
FIG. 1 is an exploded perspective view of a stator assembly according to a prior art.
Figure 2:
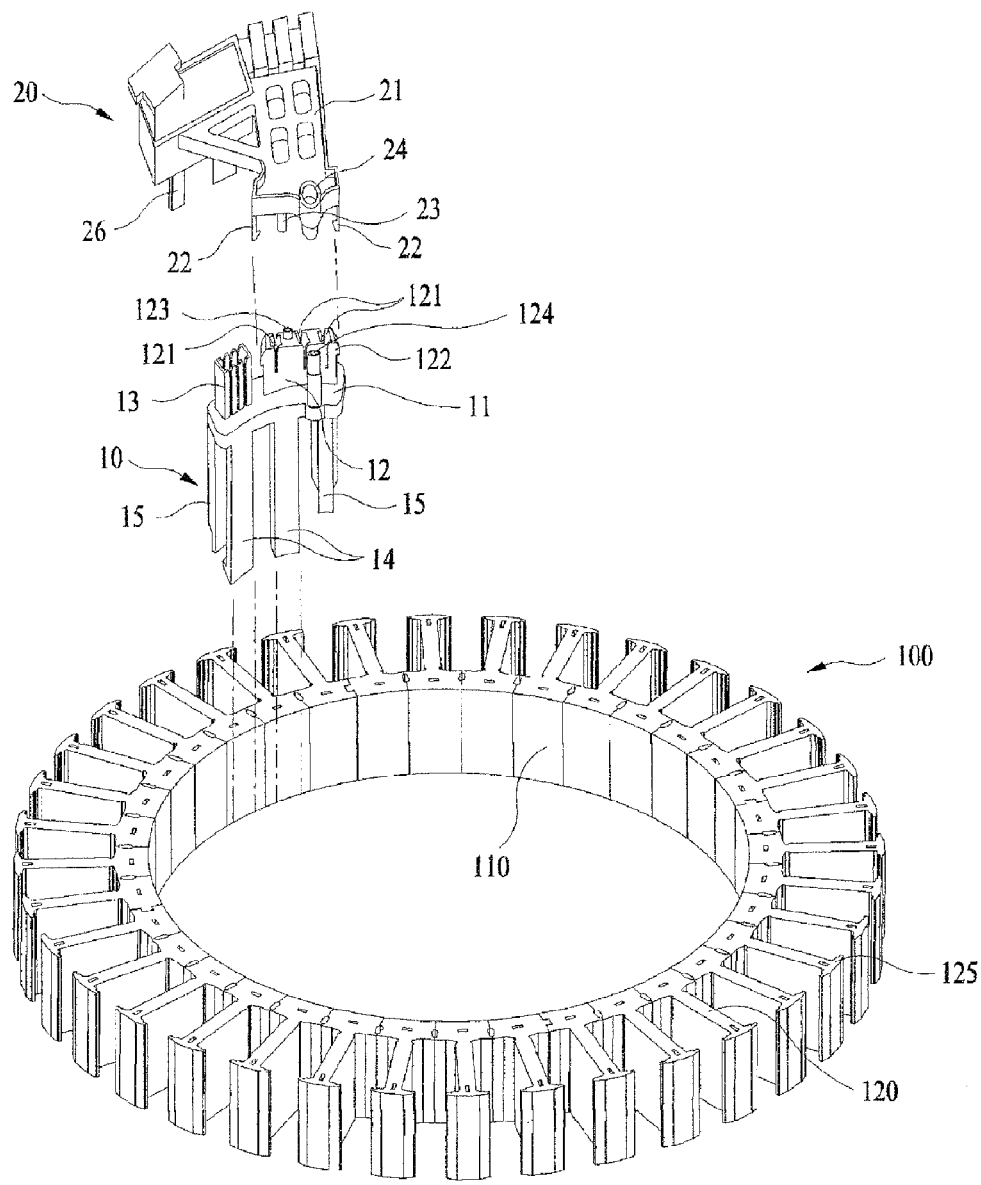
FIG. 2 is an exploded perspective view of a stator assembly according to the present invention.
Figure 3:
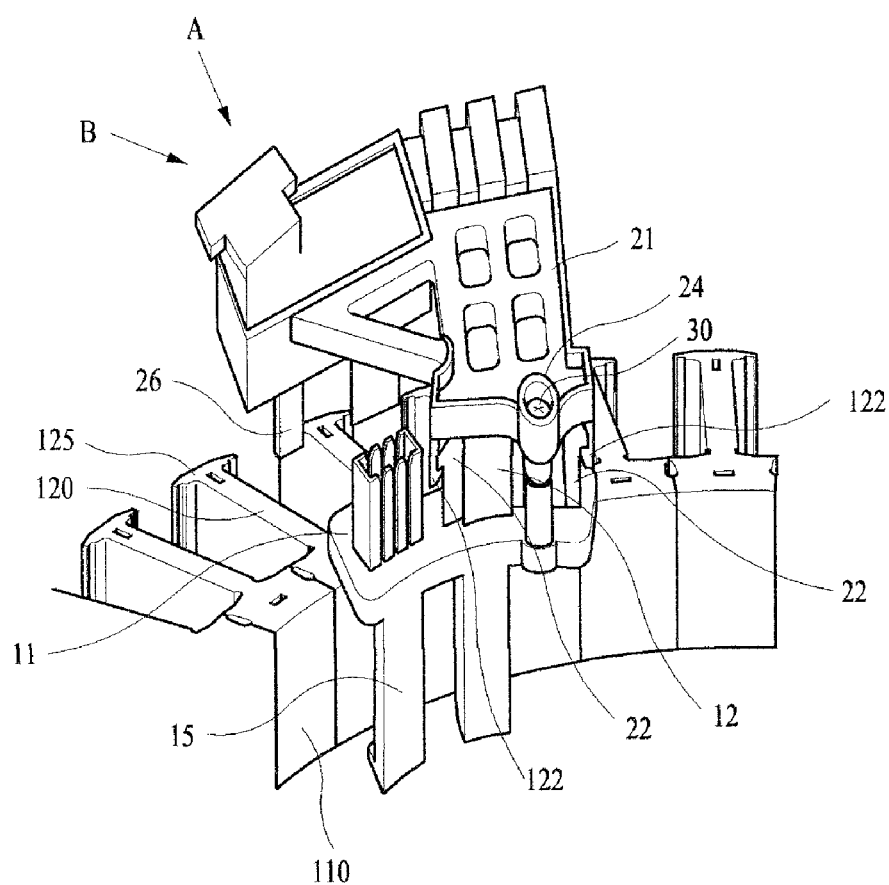
FIG. 3 is a partially enlarged perspective view of the stator assembly according to the present invention.
Figure 4:
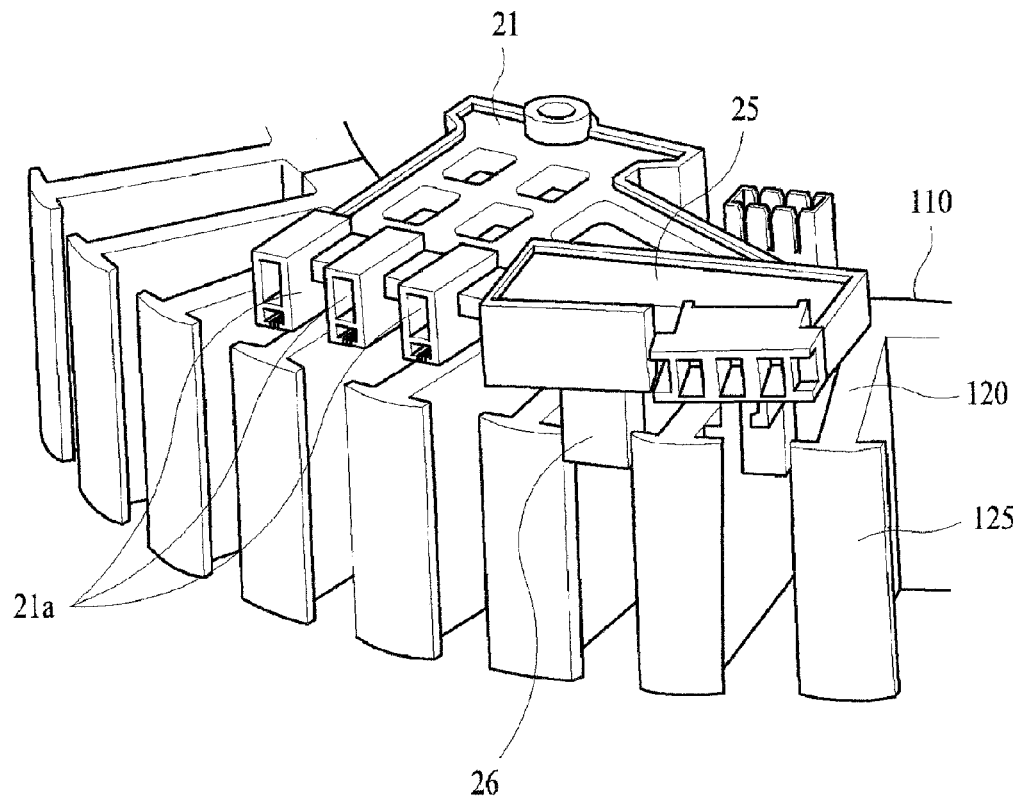
FIG. 4 is an enlarged perspective view viewed from an A direction of FIG. 3.

FIG. 2 is an exploded perspective view of a stator assembly according to the present invention, FIG. 3 is a partially enlarged perspective view of the stator assembly according to the present invention, and FIG. 4 is an enlarged perspective view viewed from an A direction of FIG. 3.

As shown in FIGS. 2 to 4, the stator assembly according to the present invention includes a stator core 100, a magmate holder 10, and a sensor cover 20.

The stator core 100 includes a circular base part 110, and a plurality of teeth 120 radially formed on an outer face of the base part 110, and each of the teeth 120 has a tooth end portion 125 formed at the end thereof in such a fashion that each of the teeth 120 have a T-shaped cross section. The teeth 120 are portions where a coil is not wound (not shown). The surface of each tooth 120 is preferably coated with a dielectric material, and hence, the wound coil and the teeth are insulated from each other. In other words, the entire surface of the stator core 100 is preferably insulated by powder coating of insulating powder. More preferably, the entire surface of the stator core 100 of the present invention is doubly coated with insulating layers. That is, the stator core 100 has a first coating layer (not shown) formed on the surface of the stator core 100 and a second coating layer (not shown) formed on the surface of the first coating layer. It is good to form the first and second coating layers by powder coating, but the present invention is not limited by the above.

The magmate holder 10 is joined and fixed to the stator core 100 and serves to join the sensor cover 2. The sensor cover 20 is joined and fixed to the magmate holder 10 and the tooth end portions 125.

The magmate holder 10 includes a base plate 11 placed on an upper portion of the base part 110. The base plate 11 is equal to or a little bit larger in width than the base part 110. It is preferable that length of the base plate 11 is three or four times the width of each of teeth 120, but the present invention is not limited by the above. The base plate 11 has at least one inner leg 14 and at least one outer leg 15 extending downward. The inner leg 14 extends downward in such a way as to be joined to the inner face of the base part 110 of the stator core, and the outer leg 15 extends downward in such a way as to be joined to the outer face of the base part 110 of the stator core. The inner leg 14 and the outer leg 15 respectively have retaining means, such as hooks, formed at ends thereof, so that the magmate holder 10 can be simply and firmly joined to the stator core.

A power connector part 12 for connecting a power line and a common terminal part 13 for connecting a common terminal are connected to an upper portion of the base plate 11. The power connector part 12 includes power terminals 121, which connect coil end portions of each phase, as many as needed according to phases. In FIG. 2, three power terminals 121 are illustrated. The power connector part 12 has at least one joining projection 122, and the joining projection 122 is joined with a hook 22 of the sensor cover 20 to serve to fix the sensor cover 20. Moreover, in order to more firmly fix the sensor cover 20, a protrusion 23 of the sensor cover 20 is inserted and fixed into a joining hole 123 formed at one side of the power connector part 12. Furthermore, in order to enhance the joining force of the sensor cover 20, a bolt joining portion 124 is formed on the upper portion of the base plate. A bolt insertion hole 24 in which a bolt is inserted is formed in the sensor cover 20 in such a way as to be correspond to the bolt joining portion 124.

The sensor cover 20 includes a body part 21 and a sensor part 25 formed at one side of the body part 21. The sensor cover 20 and the magmate holder 10 are joined together by a hook 22 protruding downwardly from the body part 21 of the sensor cover 20, and the sensor cover 20 and the stator core 100 are joined together by a fixed leg 26 formed at a lower portion of the sensor cover 25.

The body part 21 of the sensor cover 20 joins the sensor cover 20 and the magmate holder 10 together and has at least one lead wire (not shown) for connecting the power connector part 12 of the magmate holder 10 with a power connection part 21a for electric connection. Width of the body part 21 is as long as a distance ranging from the tooth end portion 125 to the inner face of the base part 110. In the stator assembly according to the prior art, because the tap terminal for the power terminal is located more inside than inside the base part 110, the sensor cover of the stator assembly according to the prior art is wider than that of the present invention. Accordingly, the stator assembly according to the present invention can reduce manufacturing costs because the length of the lead wire for connecting the power connection part 21a and the power connector part 12 with each other and amount of resin molding used for the sensor cover are reduced.

At least one hook 22 protruding downward is formed at the lower portion of the body part 21, namely, at a position corresponding to the joining projection 122 of the power connector part 12, and the number of the hooks 22 corresponds to the number of the joining projections 122 of the magmate holder 10. The hook 22 and the joining projection 122 are engaged and fixed to each other, but the forms of the hook 22 and the joining projection 122 are not restricted to the forms illustrated in FIG. 2.

A protrusion 23, which protrudes downward, is formed at the lower portion of the body part 21, namely, at a position corresponding to the joining hole 123 of the power connector part 12. The protrusion 23 is inserted into the joining hole 123 to make the sensor cover be more firmly joined. The terms, joining hole 123 and protrusion 23 in the present invention may be switched each other in spite of their outer meanings. In other words, the joining hole 123 may have the shape of the protrusion and the protrusion 23 may have the shape of the joining hole 123.

A bolt insertion hole 24 is formed at the upper portion of the body part 21, namely at a position corresponding to the bolt joining portion 124 of the power connector part 12. A bolt 30 is inserted into the bolt insertion hole 24 and joined to the bolt joining portion 124, so as to enhance a joining force of the sensor cover 20.

The sensor cover 20 includes a hall sensor (not shown) mounted inside the sensor part 25 and at least one fixed leg 26 formed on the lower portion of the sensor cover 20. The fixed leg 26 is joined to the tooth end portion 125 of the stator core 100, and referring to FIG. 5, the structure of the sensor cover 20 will be described in detail.

Figure 5:
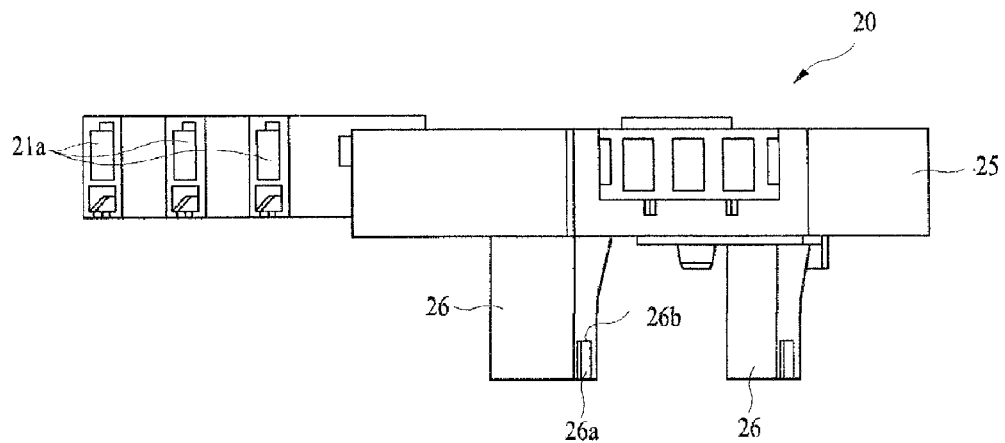
FIG. 5 is a side view viewed from a B direction of FIG. 3.

FIG. 5 is a side view of the sensor cover 20 viewed from a B direction of FIG. 3.

As shown in FIG. 5, the sensor part 25 of the sensor cover 20 has at least one fixed leg 26 formed on a lower portion of the sensor part 25. The fixed leg 26 is joined to the tooth end portion 125 and includes a tooth end insertion hole 26a, which is formed at one side or both sides of the lower portion of the fixed leg 26, and, to which the tooth end portion 125 is inserted. Additionally, a stopper 26b is formed at an end portion of an upper portion of the tooth end insertion hole 26a to prevent the tooth end portion from being inserted more. Through such a structure of the fixed leg 26, the fixed leg 26 can support the outer part of the sensor cover 20.

While the present invention has been particularly shown and described with reference to exemplary embodiment thereof, it will be understood by those of ordinary skill in the art that various changes in form and details may be made therein without departing from the spirit and scope of the present invention described in claims.

EXPLANATION OF ESSENTIAL REFERENCE NUMERALS IN DRAWINGS

10: magmate holder 11: base plate
12: power connector part 13: common terminal part
14: inner leg 15: outer leg
20: sensor cover 21: body part
21a: power connection part 22: hook
23: protrusion 24: bolt insertion hole
25: sensor part 26: fixed leg
26a: tooth end insertion hole
26b: stopper 30: bolt
100: stator core 110: base part
120: teeth 121: power terminal
122: joining projection 123: joining hole
124: bolt joining portion
125: tooth end portion 210: upper insulator
211: tap terminal for power terminal
212: tap terminal for common terminal
215: sensor cover 216: tap connection part
220: lower insulator

The invention claimed is:

1. A stator assembly, which includes a circular base part and a stator core having a plurality of teeth radially formed on an outer face of the base part and respectively having a tooth end portion, the stator assembly comprising:
   a magmate holder including a base plate, at least one inner leg and at least one outer leg formed at a lower portion of the base plate, and a power connector part formed on an upper portion of the base plate and having a joining projection formed at one side thereof; and
   a sensor cover including a body part and a hook formed on a lower portion of the body part and being joined with the joining projection,
   wherein the sensor cover comprises a sensor part disposed at one side of the body part thereof and the sensor part comprises at least one fixed leg, which is formed at a position corresponding to the tooth end portion and has a tooth end insertion hole formed at a lower end portion of one side of the fixed leg.

2. The stator assembly according to claim 1, wherein a stopper is formed on the upper end of the tooth end insertion hole.

3. The stator assembly according to claim 1, wherein the body part comprises a bolt insertion hole formed at one side thereof, and a bolt inserted into the bolt insertion hole is inserted and fixed into a bolt insertion hole formed in the base plate of the magmate holder.

4. The stator assembly according to claim 1, wherein the stator core comprises an insulation coating layer formed on the outer surface thereof.

* * * * *